United States Patent [19]

Lightsey et al.

[11] Patent Number: 5,763,388

[45] Date of Patent: Jun. 9, 1998

[54] PROCESS FOR PRODUCING IMPROVED SILICA-REINFORCED MASTERBATCH OF POLYMERS PREPARED IN LATEX FORM

[75] Inventors: John W. Lightsey; David J. Kneiling, both of Baton Rouge, La.; John M. Long, Canton, Ohio

[73] Assignee: DSM Copolymer, Inc., Baton Rouge, La.

[21] Appl. No.: 769,207

[22] Filed: Dec. 18, 1996

[51] Int. Cl.$^6$ .............................. C08K 3/36; C08K 5/54
[52] U.S. Cl. .................. 523/212; 523/213; 524/492; 524/493; 524/262; 524/265; 524/567; 524/571; 524/575.5
[58] Field of Search ................................ 523/212, 213; 524/492, 493, 262, 265, 571, 575, 575.5, 567

[56] References Cited

U.S. PATENT DOCUMENTS 4,519,430  5/1985  Ahmad et al. ..................... 524/571

*Primary Examiner*—Vasu Jagannathan
*Assistant Examiner*—Olga Asinovsky
*Attorney, Agent, or Firm*—Rockey, Milnamow & Katz, Ltd.

[57] ABSTRACT

A process for the incorporation of silica into a polymer in latex in which a silica is treated with an organo silicon compound coupling agent in aqueous suspension to form a compatibilized silica and then contacting a polymer latex with the compatibilized silica whereby the silica becomes substantially uniformly distributed throughout the latex and can be recovered when the latex is coagulated to yield little residual silica in the liquid residue from the latex. Also described is a process for preparing the compatibilized silica.

37 Claims, No Drawings

PROCESS FOR PRODUCING IMPROVED SILICA-REINFORCED MASTERBATCH OF POLYMERS PREPARED IN LATEX FORM

BACKGROUND OF THE INVENTION

This invention relates to an improved process for the manufacture of silica-filled masterbatches of natural and synthetic rubber and thermoplastic polymers, particularly to those polymers prepared by emulsion polymerization processes, and to an improved process for the uniform incorporation of a compatibilized silica slurry into such polymers at the latex stage.

Silica and carbon black have been commonly used as reinforcing agents and/or fillers in rubber and thermoplastic polymers. A number of techniques have been developed to incorporate such reinforcing agents and fillers into the polymer compositions, including both wet and dry blending processes. The incorporation of such silica and carbon black as reinforcing agents and/or fillers is far more complex than might otherwise appear. One problem in wet blending of silica with latices of such polymers arises from the fact that the hydrophilic silica has a tendency to associate with the aqueous phase and not blend uniformly with the hydrophobic polymer. Use cannot be made of the hydrophobic fumed silicas because these have been treated to eliminate most of the hydrophilic, reactive sites and consequently cannot be dispersable in water. The relatively high cost of the hydrophobic fumed silicas also prohibit their use in many dry blending applications.

To overcome the problems associated with the hydrophilic nature of the silica, U.S. Pat. No. 3,317,458 proposed a process whereby an aqueous solution of silicic acid was treated so as to precipitate silica directly onto the surface of an aqueous carbon black in paste form. One significant limitation of this technique is that the surface of the carbon black is altered thus obviating the utility of the many surface, structure characteristics of specialty carbon blacks available to the skilled compounder in designing filled, reinforced polymers for specific end uses.

Attempts have been made to use cationic emulsifiers in an effort to distribute such fillers and/or reinforcing agents in polymeric latices; notably among them are quaternary alkylated ammonium halides, German Patent No. 1,188,797. It has been found, however, that such quaternary ammonium compounds have a tendency to react with the carbon black, dispersing it into the aqueous phase; that limiting the ability to blend carbon black with the polymeric components in the latex. In U.S. Pat. No. 3,686,113 never dry silica is treated with oleophilic quaternary ammonium compounds to blend with an aqueous dispersion of an elastomer containing an anionic dispersing agent. In addition to the problem referenced above with carbon black dispersion, unfortunately, such techniques require specific coagulating agents.

Perhaps the most commonly employed practice, used commercially, is the technique of dry blending either silica, carbon black or both of them into rubber and thermoplastic polymers in a high-shear milling operation. That practice has many limitations. Notable among them include the tendency of the filler particles to agglomerate to each other, resulting in nonuniform dispersion of the filler throughout the polymer constituting the continuous phase. Another problem commonly experienced in such high-shear milling operations is the tendency of the polymers to degrade during milling. That necessitates the use of higher molecular weight polymers, which sometimes require the incorporation of various types of processing aids to facilitate mixing and dispersion of the filler particles into the polymer constituting the continuous phase. The cost associated with the use of such processing aids also increases the manufacturing cost of the polymeric compound or article. The use of processing aids has the further disadvantage in that such processing aids may have a negative effect on the cure or end use of the polymer. And, in addition, dry blending techniques adds additional processing costs, in part due to the accompanied excessive equipment wear by the abrasive fillers.

To improve dispersion of the silica during dry mixing, it has been proposed that such compounding operations employ a silica which has been treated with an organo silane coupling agent having dual functionality. Representative of such coupling agents are those well known compounds that include both an organic group such as an amino alkyl or a mercaptoalkyl group bonded directly to the silicon atom along with a readily hydrolyzable group, such as an alkoxy group as represented by a methoxy group or an ethoxy group likewise bonded directly to the silicon atom. In those systems, it is generally recognized that the alkoxy group hydrolyzes in the presence of moisture typically found on the surface of the silica to form the corresponding silanol which reacts with or condenses in the presence of the silica surface to bond the silicon atom to the silica surface. The organic groups likewise attached to the silicon atom are thus available for chemical reaction with the polymer matrix during vulcanization. As a result, the polymer matrix may become chemically bonded by means of the coupling agent to the silica surface during cure or vulcanization of the polymer. Problems associated with the use of such silanes during compounding are unpleasant odors, premature curing, and/or scorching.

In an effort to overcome the problems associated with the use of silane coupling agents, it has been proposed in U.S. Pat. No. 5,405,897 to employ phenoxy acidic acid along with a methylene donor in place of the conventional organo silanes. The foregoing patent suggests that the use of such a system provides improved physical properties and reduced viscosity of the melt during compounding.

Various other attempts have been made to overcome the problems associated with wet blending such fillers and/or reinforcing agents with polymer latices. For example, it has been proposed, as described in U.S. Pat. Nos. 3,055,956 and 3,767,605 to add carbon black in the form of a slurry directly to an emulsion polymerization process of rubber polymer, at the latex stage, followed by coagulation and recovery of a rubber-carbon black masterbatch. Such processes work well with carbon black but fail to incorporate substantial amounts of fine particle silica. U.S. Pat. No. 4,481,329 proposes a process for dispersing carbon black and like fillers into concentrated rubber latices by the use of a low molecular weight conjugated diene/carboxylic acid polymer in the form of an alkali metal salt dissolved in water as the dispersing aid or dispersing latex.

U.S. Pat. No. 4,482,657 describes mixtures of silica and synthetic polymers prepared by treating a polymer latex with a dispersion of silica and an alkyl trimethyl ammonium halide in water. Not only does the quaternary ammonium halide disrupt the blending of carbon black, the process requires the slow addition of the silica dispersion to prevent premature coagulation. Other elaborate techniques as described in U.S. Pat. No. 3,907,734 where a partitioning agent in the form of a blend of precipitated silica and hydrophobic fumed silica are incorporated into a concentrated polymer latex have been suggested. The silica adsorbs the water, and the resulting solid mixture is dried with removal of the hydrophobic fumed silica to form a free flowing blend of polymer particles coated with precipitated silica. That process is limited to relatively small scale batch system and requires recovery and recycle of the hydrophobic fumed silica. That process fails to incorporate into the polymer the more desirable hydrophobic fumed silica.

Such processes with concentrated latex, as those skilled in the art can readily appreciate, involve complex procedures not only blending the silica with the polymer latex, but also in effecting its recovery when excess silica or carbon black must be employed. Another limitation of such processes is that recovery of the filled polymer directly from the latex stage without filtration and like treatment steps used to remove byproducts from the emulsion polymerization can have deleterious effects on the end use properties of the polymer thus recovered. Such problems can be seen in French Patent Nos. 2,558,008 and 2,558,874. In the first, the addition to a rubber latex of precipitated silica effects coagulation of the rubber polymer. In the second, a stable latex of derivatized silica and a carboxylated butadiene rubber is prepared to add to natural or synthetic elastomer latices. The derivatization of the silica is accomplished by treatment with polyamines, polyethylene amines or nonionic polyoxyethylene. Such free agents are wholly incompatible with typical coagulation techniques used in the recovery of the emulsion process polymers.

Thus, there is a need to provide a simple and less expensive technique for the uniform incorporation of silica fillers alone or with other reinforcing agents, particularly carbon blacks, into natural and synthetic polymers which do not require the use of complex processing aids.

It is accordingly an object of the present invention to provide a process for the incorporation of silica into a natural or synthetic polymer at the latex stage which overcomes the foregoing disadvantages.

It is a more specific object of the present invention to provide a process for the incorporation of silica alone or with carbon blacks into natural and synthetic polymers at the latex stage which is simple and inexpensive and can be used to incorporate the silica without causing premature coagulation of the latex.

It is yet another object of the invention to provide a process for the incorporation of silica reinforcing agent alone or with other fillers, particularly carbon blacks, into natural and synthetic polymers in which the silica can be substantially uniformly dispersed and can compatibilize or react with the polymer matrix during processing for end use.

It is yet another object of the invention to provide a wet process for treating precipitated or fumed silica with a coupling agent whereby it becomes compatible with the natural or synthetic polymer phase of a polymer latex.

These and other objects and advantages of the invention will appear more fully hereinafter from the following description of the invention.

SUMMARY OF THE INVENTION

The concepts of the present invention reside in a process for the incorporation of a compatibilized silica as a reinforcing agent and/or filler into natural and synthetic rubber and thermoplastic polymers in which a precipitated or fumed silica is first treated in an aqueous suspension with a coupling agent, and preferably a silicon-containing coupling agent, to form a compatibilized silica slurry. Thereafter, the compatibilized silica slurry is then blended with the natural or synthetic polymer latex whereby the silica is substantially uniformly distributed through the polymer latex and does not alter the physical state of the polymer particles in such latex, thus permitting the incorporation into said latex of other processing chemicals, such as fillers like carbon black, plasticizers, processing oils, and antioxidants. Thus, the silica is incorporated into and adheres to the polymer after coagulating the latex in accordance with conventional techniques whereby the silica becomes substantially uniformly distributed through the polymer particles as fillers and/or reinforcement therefor without altering the performance of other processing chemicals.

The process of this invention is suited for use with any natural or synthetic polymer made into latex form. The process of this invention is particularly suited for natural and synthetic rubber latices and for incorporation into a continuous or batch emulsion polymerization process at the latex stage. A preferred continuous emulsion polymerization process is one which has been modified for incorporation of carbon black slurry into the latex.

The term "compatibilized silica slurry" refers to an aqueous suspension of silica with some of its reactive sites rendered hydrophobic via a reaction with a coupling agent, the hydrophobic portion of said coupling agent being compatible with the natural or synthetic polymer to which the silica is blended. In the practice of the invention, the coupling agent employed is a coupling agent directly soluble in water or soluble in water with the aid of a cosolvent, has a functional group having the capability of chemically reacting with the surface of the silica to bond the coupling agent to the silica and additionally has a group capable of compatibilizing with the natural or synthetic polymer to which the silica will be blended. Optionally, in a preferred embodiment, the coupling agent also has a functional group having the capability of reaction with a rubbery polymer during the cure thereof to chemically bond the coupling agent to the rubber polymer. Consequently, the coupling agent serves to promote a chemical bonding relationship between the silica surface and compatibilization of natural or synthetic polymers. In the case of crosslinkable, curable polymers the coupling agent may serve to promote a chemical bonding relationship between both the silica surface and the cured polymer.

It has been found that the concepts of the present invention serve to substantially uniformly disperse the compatibilized silica throughout the polymer latex whereby the silica is uniformly and almost quantitatively dispersed into the polymer once the latex has been coagulated and is readily available to serve as a reinforcing agent and/or filler. The addition of the compatibilized silica slurry exhibits no substantial effect on the stability of the latex and does not have a tendency to effect coagulation thereof. The concepts of the present invention totally avoid the need to employ the complex processing aids frequently employed in the prior art to effect dispersion of the silica within the polymer.

DETAILED DESCRIPTION OF THE INVENTION

The concepts of the present invention are applicable to a variety of natural and synthetic rubber and thermoplastic polymers made in latex form. Typical of the synthetic polymers useful in the practice of the present invention are those prepared by polymerizing or copolymerizing conjugated diene monomers such as butadiene, isoprene, chloroprene, pentadiene and the like. It is also possible to apply the concepts of the present invention to other polymers made in latex form including, not only conjugated diene-based polymers, but also polymers based on vinyl monomers and combinations of conjugated dienes with vinyl monomers. These conjugated diene monomers can also be copolymerized with suitable vinyl monomers such as styrene, α-methylstyrene, alkyl substituted styrenes, acrylonitrile, methacrylonitrile, isobutylene, acrylic esters and acids, methylacrylic esters, vinyl pyridines and the like. Specific polymers are exemplified by natural rubber, styrene-butadiene rubber or SBR, acrylonitrile-butadiene rubber or NBR, acrylonitrile-butadiene-styrene polymer or ABS, polyvinylchloride or PVC, butadiene-vinyl pyridine polymers, polyisoprene, blends of acrylonitrile-butadiene rubber with polyvinylchloride, etc.

The process of the present invention is carried out with these polymers in their latex form and is particularly suited for application to natural rubber latices and as polymerized latices. Obvious to those skilled in the art of emulsion polymerization, as polymerized latex refers to the reaction mixture prior to the coagulation stage in an emulsion process. The process of this invention can be carried out with polymer latices to which other fillers are added, such as carbon black, so that silica-carbon black masterbatches are attainable with uniform high loads of total filler and quantitative incorporation of the fillers.

In the practice of the invention, a silica is first treated with a coupling agent in an aqueous solution to form a compatibilized silica slurry. As the silica employed in the practice of the invention, use can be made of a number of commercially available amorphous silica of either the precipitated or fumed type having finely divided particle sizes and high surface area. As will be appreciated by those skilled in the art, the size of the silica particles may be varied within relatively wide ranges, depending somewhat on the end use of the silica-filled or silica-reinforced polymer. In general, use is made of silica having average particle sizes ranging from 1 to 120 nm, and preferably 7 to 60 nm and corresponding surface areas of 15–700 m$^2$/g.

The finely divided silica is thus formed into an aqueous slurry and treated with a solution of a coupling agent which can chemically bond to the silica surface. As the coupling agent, use can be made of a variety of compounds known in the prior art for use in coupling hydrophilic filler materials such as glass fibers, silica and the like to hydrophobic materials such as natural and synthetic polymers useful as rubbers or thermoplastic materials. Preferred for use as coupling agent in the practice of the present invention are organo silicon compounds well known to those skilled in the art which have been used in the prior art to bond silica to natural and synthetic polymers. In general, such silicon compounds contain at least one, but no more than three, readily hydrolyzable groups bonded directly to the silicon atom. Representative of the hydrolyzable groups commonly employed in such coupling agents are typically halogens, hydrogen, hydroxyl, lower alkoxy groups such as methoxy, ethoxy, propoxy and like groups. Also attached directly to the silicon atom are one to three organic groups compatible with the natural or synthetic polymer to which the silica is to be added, and preferably for specific embodiments, the coupling agent will have at least one organic group containing a functional group capable of chemical reaction with the natural or synthetic polymer to which the silica is to be added. Such functional groups include but are not limited to amine groups, polyamino alkyl groups, mercapto groups, carbonyl groups, hydroxy groups, epoxy groups and ethylenically unsaturated groups. The choice of functional group will be determined by the particular polymer and the particular method of fabrication of the polymer-silica masterbatch. For example, if this invention is applied to a styrene-butadiene rubber to provide a silica masterbatch which will be cured via crosslinking reactions involving sulfur compounds, it is preferred to utilize as the coupling agent an organo silicon compound wherein at least one organic group has mercapto, polysulfide and/or amino functionality. Correspondingly, if the silica filled polymer is to undergo a peroxy type of curing reaction, it is desirable to have as the organo silicon compound one wherein at least one organic group has ethylenic unsaturation or epoxy groups.

Representative of coupling agents imparting compatibilization to the natural and synthetic polymers are those from the groups consisting of trialkylsilanes, dialkylsilanes, trialkylalkoxysilanes, trialkylhalosilanes, dialkyalkoxysilanes, dialkyldialkoxysilanes, dialkylalkoxyhalosilanes, trialkylsilanols, alkyltrialkoxysilanes, alkyldialkoxysilanes, alkyldialkoxyhalosilanes, and monoalkylsilanes wherein the alkyl group is a C1 to C18 linear, cyclic, or branched hydrocarbon or combinations thereof, and wherein for some particular embodiments one or two alkyl groups can be replaced with a phenyl or benzyl group or one to two alkyl groups can be replaced with a phenyl, benzyl, or alkoxy substituted alkyl group.

In the preferred practice of the invention, one particular form of coupling agents employed are those having the general structure:

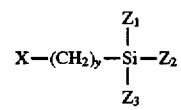

wherein X is a functional group selected from the group consisting of an amino group, polyamino alkyl group, a mercapto group, a polysulfide group, an epoxy group, a hydroxy group, a vinyl group, an acryloxy group and a methacryloxy group; y is an integer equal to or greater than 0, and preferably within the range of 2 to 8; and, $Z_1$, $Z_2$ and $Z_3$ are each independently selected from the group consisting of hydrogen, $C_1$ to $C_{18}$ alkyl, aryl such as phenyl, benzyl and the like, cycloalkyl such as cyclopentyl, cyclohexyl, etc., or aryl, alkoxy or halo substituted alkyls and C1 to $C_8$ alkoxy groups, with the proviso that at least one of $Z_1$, $Z_2$ or $Z_3$ must be one of the foregoing alkoxy groups or one of the Z's must be a halogen, hydroxyl, or hydrogen group.

A somewhat related group of coupling agents which may likewise be used in the practice of the invention are the bispolysulfides. These organo silicon compounds can be described as bis(trialkoxysilylalkyl) polysulfides containing 2 to 8 sulfur atoms in which the alkyl groups are $C_1$–$C_{18}$ alkyl groups and the alkoxy groups are $C_1$–$C_8$ alkoxy groups.

Representative of such coupling agents which are commercially available include (gamma-aminopropyl) trimethoxysilane, (gamma-aminopropyl)triethoxysilane, (gamma-hydroxypropyl)tripropoxysilane, (gamma-mercaptopropyl) triethoxysilane, (gamma-aminopropyl) dimethylethoxysilane,(gamma-aminopropyl) dihydroxymethoxy-silane, (glycidylpropyl) (trimethoxysilane, [(N-aminoethyl)gamma-aminopropyl] triethoxysilane, (gamma-methacryloxy-propyl) triethoxysilane, (gamma-methacryoxy-propyl) trimethoxysilane, (beta-mercaptoethyl) triethoxysilane, [gamma-(N-aminoethyl)propyl]trimethoxysilane, N-methylaminopropyltrimethoxysilane, (gamma-thiocyanatopropyl) triethoxysilane, bis-(3-triethoxythiopropyl)tetrasulfide, vinyltriethoxysilane, vinylphenylmethylsilane, vinyldimethylmethoxysilane, divinyldimethoxysilane, divinylethyldimethoxysilane, dimethylvinylchlorosilane, and the like.

In carrying out the reaction between coupling agents, such as organo silanes, and the silica, the coupling agent can be dissolved in a lower alkanol such as propanol or ethanol at a pH below 9 and preferably within the range of 3 to 9 to which water is slowly added, either continuously or incrementally, to commence hydrolysis of the hydrolyzable groups contained in the coupling agent to form the corresponding silanol. To assist in the hydrolysis of an alkoxy group, a pH in the range of 4–4.5 is desirable to minimize side reactions such as oligomerization of the organo silane, and can be maintained by use of dilute mineral acid such as hydrochloric or weak organic acids such as acetic acid. To assist in the hydrolysis of a hydride group more alkaline conditions are preferred and bases such as KOH, NaOH, $NH_4OH$, triethylamine, or pyridine can be employed to maintain a pH of 8–9. The choice of base will be dependent on the chemical nature of the specific latex to which the silica slurry is added. When the hydrolyzable group is halogen, it is preferred to mix the organohalo-silane directly with the aqueous silica dispersion. The hydrolyzed coupling agent is then blended with an aqueous slurry of the finely divided silica whereby the silanol groups present in the coupling agent chemically react with the surface of the silica to form a siloxane bond (Si—O—Si) between the coupling agent and the silica surface.

The concentration of the silica in the slurry with which the hydrolyzed coupling agent is blended can be varied within relatively wide limits. In general, use can be made of silica slurries containing 1% to 30% by weight silica based on the weight of the slurry. In some preferred embodiments, the slurry concentration ranges from 10 to 20% by weight silica based on the weight of the slurry. Temperature and reaction time can be varied within wide limits. In general, temperatures ranging from ambient up to about 200° F. may be used, with the preferred temperature ranging from 80° to 180° F. Similarly, the time for effecting the reaction between the hydrolyzed coupling agent and the silica can be varied within relatively wide limits, generally ranging from 4 to 48 hours, depending somewhat on the temperature employed.

The amount of the coupling agent employed can likewise be varied within relatively wide limits, depending in part on the amount of silica to be blended with the natural or synthetic polymer and the molecular weight of the coupling agent. Use can be made of a coupling agent within the range of 1 to 25 parts of coupling agent per 100 parts by weight of silica, preferably 1 to 15 parts by weight of coupling agent per 100 parts by weight of silica, and more preferably 3–10 parts of coupling agent per 100 parts by weight of silica.

After the silica has been treated with the coupling agent, the treated silica slurry is then blended with the natural or synthetic polymer latex with sufficient agitation to uniformly distribute the treated silica throughout the latex. This silica treated latex is stable and can be stored for later use or fed directly to a coagulation process, where coagulation aids conventional for that type of natural or synthetic polymer are employed. The amount of the silica added to the latex can be varied within wide ranges, depending in part on the coupling agent employed, the nature of the polymer, the use of other fillers such as carbon black, and the end use to which that polymer is subjected. In general, good results are obtained where the silica is added in an amount within the range of 5% to about 80% by weight based upon the weight of the solids in the latex.

The coagulation of the latex is generally conventional, and does not form any part of the present invention. It is convenient to use equipment and coagulation chemicals commonly employed in the recovery of natural and synthetic polymers from latices. During coagulation, the compatibilized silica remains dispersed, intimately admixing and adhering to the polymer particles resulting in a substantially uniform distribution of the silica particles within the particles of the polymer. Other processing aids typically added to polymer latices such as plasticizers, extender oils, and antioxidants can be added at the latex stage along with the compatibilized silica slurry without modifying equipment and process conditions, or adversely effecting the dispersion of the silica during coagulation and dewatering.

It has been found, in the practice of the invention, that the method of the invention allows the incorporation of significantly greater quantities of the compatibilized silica in the polymer as compared to techniques for incorporating silica known in the prior art. It has been found that from 90 to 100% of the silica added to the latex becomes incorporated in the polymer, and indeed, in most cases, the amount of silica incorporated into the polymer is 97% or higher. That represents a significant economic advantage in that, once the latex is coagulated to recover the polymer containing the compatibilized silica, the residual liquid phase contains only small amounts of the compatibilized silica which were not incorporated into the polymer.

It will be understood that various changes and modifications can be made in the details of formulation, procedure and use. The following examples are provided by way of illustration and not by way of limitation of the practice of the present invention.

Chemicals used to demonstrate the concepts of this invention are as follows:

Silquest® A-189 (OSi Specialties) is (gamma-mercapto) propyltrimethoxysilane.

HiSil® 233 (PPG) is a precipitated, hydrated amorphous silica in powder form, ultimate particle size of 0.019 microns.

Ciptane® I (PPG) is HiSil® 210, precipitated, hydrated amorphous granular silica, coated with 3 weight percent Silquest A-189.

EXAMPLE 1

Preparation of an SBR-Silica-Carbon Black Masterbatch

A. Preparation of Compatibilized Silica Slurry

An aqueous solution of silane was prepared by charging to a vessel 55.1 g Silquest® A-189 (OSi Specialties), 27 g isopropanol, 1.1 g of glacial acetic acid and 27 g water. The initially cloudy mixture was agitated at high speed and room temperature until clear, about 10–20 minutes, after which an additional 28 g of water were added which made the mixture cloudy. Agitation was continued for about 15–20 minutes until the solution cleared.

To a separate vessel equipped with a stirrer 16 lb of water and 4.05 lb of fine-particle, dry silica, HiSil® 233, were charged and agitated for about 15 min to wet and disperse the silica. The aqueous solution of silane was then added with continued agitation, the pH was increased to 7.5–8.0 with 25% sodium hydroxide and the blend was heated to 170° F. The temperature was maintained at 170° F. for about four hours then allowed to cool to 140° F. At this point the compatibilized silica slurry can be added to the latex stage of a continuous emulsion process or fed batchwise to a concentrated polymer latex.

B. Blend Compatibilized Silica Slurry with SBR Latex

Slurry as prepared in Step A above was charged to an agitated vessel containing a mixture of 41.1 lb of SBR latex containing 21.9 wt % 1502-type rubber and 183 g of antioxidant emulsion containing 13.4 wt % Santoflex® 134 held at 140° F. To this initial mixture was also charged 21.8 lb of hot carbon black slurry containing 6.2 wt % N234-type carbon black and 2.74 lb of hot oil emulsion containing 65.6 wt % Sundex® 8125. The final mixture was agitated for 30 min at 140° F.

The above latex blend was slowly added to a larger, agitated vessel which initially contained 40–45 lb of water and sufficient sulfuric acid to give a pH of 4. The rates of addition of latex blend and sulfuric acid were varied to maintain the pH of the resulting coagulation serum in the range of 4–5 over the 30–40 minutes that the latex blend was added. An additional 30–40 minutes of mix time and additional acid were used as needed to allow product particle size to grow and to clear the serum of free latex as is commonly done by those familiar with the art. The wet masterbatch particle or crumb size achieved by this coagulation was similar to that obtained from coagulations without silica. Visual inspection and chemical analysis of the dried masterbatch showed that essentially all solid and liquid components added to the latex mixture were absorbed and uniformly distributed. Silica absorption was 97–98% of charge as estimated by ash analysis.

EXAMPLE 2

Preparation of an SBR-Silica-Carbon Black Masterbatch

A. Preparation of Compatibilized Silica Slurry

An aqueous solution of silane was prepared by charging to a vessel 110.2 g Silquest® A-189, 55 g isopropanol, 2.2 g of glacial acetic acid and 55 g water. The initially cloudy mixture was agitated at high speed and room temperature until clear, about 10–20 minutes, after which an additional 55 g of water were added which made the mixture cloudy. Agitation was continued for about 15–20 minutes until the solution cleared.

To a separate vessel equipped with a stirrer 16 lb of water and 4.05 lb of fine-particle, dry silica, HiSil® 233, were charged and agitated for about 15 min to wet and disperse the silica. The aqueous solution of silane was then added with continued agitation, the pH was increased to 7.5–8.0 with 25% sodium hydroxide and the blend was heated to 170° F. The temperature was maintained at 170° F. for about four hours then allowed to cool to 140° F. At this point the compatibilized silica slurry can be added to the latex stage of a continuous emulsion process or fed batchwise to a concentrated polymer latex.

B. Blend Compatibilized Silica Slurry with SBR Latex

Slurry as prepared in Step 2A above was charged to an agitated vessel containing a latex mixture as described in Example 1. The final masterbatch mixture was agitated for 30 min at 140° F.

The above latex blend was coagulated as in Example 1. The wet masterbatch particle or crumb size achieved by this coagulation was similar to or slightly larger than that obtained from coagulations without silica. Visual inspection and chemical analysis of the dried masterbatch showed that essentially all solid and liquid components added to the latex mixture were absorbed and uniformly distributed. Silica absorption was about 99% of charge as estimated by ash analysis.

EXAMPLE 3

Preparation of an SBR-Silica Masterbatch

Compatibilized Silica Slurry as prepared in Example 2 Step A above was charged to an agitated vessel containing a latex mixture prepared from 41.1 lb of SBR latex containing 21.9 wt % 1502 SBR and 193 g of Santoflex 134 solution 1 (13.4 wt %) held at 140° F. To this mixture was also charged 2.74 lb of hot oil emulsion containing 65.6 wt % Sundex 8125. The mixture was agitated for an additional 35 minutes maintaining 140° F. temperature, after which the hot latex was slowly charged to another vessel for coagulation per the procedure of Example 1B. The dewatered crumb was similar in particle size to that of SBR without silica. Visual inspection and chemical analysis of the dry crumb showed that essentially all of the oil and silica added to the latex were absorbed and uniformly distributed. Silica absorption was 98–99% of the charge as estimated by ash analysis.

EXAMPLE 4

Preparation of an NBR-Silica Masterbatch

A. Preparation of Compatibilized Silica Slurry

An aqueous solution of silane was prepared by charging to a vessel 25.4 g Silquest® A-189, 13 g isopropanol, 0.5 g of glacial acetic acid and 13 g water. The initially cloudy mixture was agitated at high speed and room temperature until clear, about 10–20 minutes, after which an additional 13 g of water were added which made the mixture cloudy. Agitation was continued for about 15–20 minutes until the solution cleared.

To a separate vessel equipped with a stirrer 6.4 lb of water and 1.4 lb of fine-particle, dry silica, HiSil® 233, were charged and agitated for about 15 min to wet and disperse the silica. The aqueous solution of silane was then added with continued agitation, the pH was increased to 7.5–8.0 with 25% sodium hydroxide and the blend was heated to 170° F. The temperature was maintained at 170° F. for about four hours then allowed to cool to 140° F. At this point the compatibilized silica slurry can be added to the latex stage of a continuous emulsion process or fed batchwise to a concentrated polymer latex.

B. Blend Compatibilized Silica Slurry with NBR Latex

Slurry as prepared in Step A above was charged to an agitated vessel containing a mixture of 29.2 lb of NBR latex containing 24.0 wt % Nysyn® 40–5 rubber and 216 g of antioxidant emulsion containing 14.7 wt % Agerite Geltrol® (Vanderbilt Chemical) held at 140° F. To this initial mixture was also charged 34.4 lb of hot carbon black slurry containing 6.1 wt % N234-type carbon black. The final mixture was agitated for 30 min at 140° F.

The above latex blend was slowly added to a larger vessel which initially contained 25 lb of water and sufficient sulfuric acid to give a pH of 4. The coagulation was completed as in previous examples. The wet masterbatch crumb size achieved by this coagulation was similar to that obtained from NBR coagulations without silica. Visual inspection and chemical analysis of the dried masterbatch showed that essentially all solid and liquid components added to the latex mixture were absorbed and uniformly distributed. Silica absorption was 97–98% of charge as estimated by ash analysis.

Comparative Example 1

Preparation of a SBR Silica carbon black Masterbatch without the Silquest Coupling Agent A. Preparation of Silica Slurry To a vessel equipped with a stirrer 5.4 lb of water and 1.35 lb of fine-particle, dry silica, HiSil® 233, were charged, agitated for about 15 min and heated to 140° F.

B. Blend Silica Slurry with SBR Latex

Slurry as prepared in Step A above was charged to an agitated vessel containing a mixture of 41.1 lb of SBR latex containing 21.9 wt % 1502-type rubber and 183 g of antioxidant emulsion containing 13.4 wt % Santoflex® 134 held at 140° F. To this initial mixture was also charged 65.3 lb of hot carbon black slurry containing 6.2 wt % N234-type carbon black and 2.74 lb of hot oil emulsion containing 65.6 wt % Sundex® 8125. The final mixture was agitated for 30 min at 140° F.

The above latex blend was coagulated as in Example 1. However, additional agitation time and acid did not produce the usual result. The average size of the masterbatch crumb particles was greatly reduced compared to a coagulation without silica, this fine particle crumb would not be recoverable in most commercial dewatering equipment. The aqueous phase or coagulation serum did not become clear at low pH as normally occurs without silica due to a remnant of free silica dispersed in the water. In the absence of agitation, the free silica settled to the bottom of the vessel.

Visual inspection and chemical analysis of the dried masterbatch showed that the carbon black and oil added to the latex mixture were absorbed and uniformly distributed. Silica absorption was about 40% of charge, as estimated by ash analysis, and the silica distribution was very non-uniform due to settling and entrapment of free silica on the surface of masterbatch crumb particles.

Comparative Example 2

Preparation of a SBR-Silica-Carbon Black Masterbatch with a Commercial Organosilane Treated Silica

A. Preparation of Compatibilized Silica Slurry

To a vessel equipped with a stirrer 24.0 lb of water and 6.0 lb of coarse-particle, dry silica, Ciptane® I (PPG), were charged and agitated for about 15 min. No aqueous solution of silane was added because Ciptane I is made from HiSil 210 pre-coated with 3 wt % of Silquest A-189 in a non-aqueous process. The slurry was heated to 140° F. at which point the silica slurry can be added to the latex stage of a continuous emulsion process or fed batchwise to a concentrated polymer latex.

B. Blend Compatibilized Silica Slurry with SBR Latex

A portion of the slurry prepared in Step A, 10.5 lb, was charged to an agitated vessel containing a mixture of 53 lb of SBR latex containing 13.2 wt % 1502-type rubber and 142 g of antioxidant emulsion containing 13.4 wt % Santoflex® 134 held at 140° F. To this initial mixture was also charged 34.4 lb of hot carbon black slurry containing 6.1 wt % N234-type carbon black and 1.62 lb of hot oil emulsion containing 65.0 wt % Sundex® 8125. The final mixture was agitated for 30 min at 140° F.

The above latex blend was slowly added to a larger vessel which initially contained 25 lb of water and sufficient sulfuric acid to give a pH of 4. Coagulation was continued as described in the above examples. The wet masterbatch crumb size achieved by this coagulation was similar to that obtained from coagulations without silica. Visual inspection and chemical analysis of the dried masterbatch showed that carbon black and oil added to the latex mixture were absorbed and uniformly distributed. Silica absorption with coarse particles was variable, about 10–15% of charge as estimated by ash analysis, and the silica distribution was very non-uniform due to settling and entrapment of the large silica granules among and on the surface of the rubber masterbatch particles.

Comparative Example 3

Preparation of a SBR-Silica-Carbon Black Masterbatch with Micronized Commercial Organosilane Treated Silica

A. Preparation of Compatibilized Silica Slurry

To a vessel equipped with a stirrer 8.4 lb of water and 2.1 lb of micronized Ciptane® I (PPG, above), were charged and agitated for about 15 min. The slurry was heated to 140° F. at which point the compatibilized silica slurry can be added to the latex stage of a continuous emulsion process or fed batchwise to a concentrated polymer latex.

B. Blend Compatibilized Silica Slurry with SBR Latex

The slurry prepared in Step A above was charged to an agitated vessel containing a mixture of 53 lb of SBR latex containing 13.2 wt % 1502-type rubber and 142 g of antioxidant emulsion containing 13.4 wt % Santoflex® 134 held at 140° F. To this initial mixture was also charged 34.4 lb of hot carbon black slurry containing 6.1 wt % N234-type carbon black and 1.62 lb of hot oil emulsion containing 65.0 wt % Sundex® 8125. The final mixture was agitated for 30 min at 140° F.

The above latex blend was slowly added to a larger vessel which initially contained 25 lb of water and sufficient sulfuric acid to give a pH of 4. Coagulation was continued as described in the above examples with results similar to Example 3. The wet masterbatch crumb size was significantly smaller than obtained from coagulations without silica. Unincorporated silica was dispersed in the serum as observed in Comparative Example 1.

Visual inspection and chemical analysis of the dried masterbatch showed that carbon black and oil added to the latex mixture were absorbed and uniformly distributed. Silica absorption was about 80–85% of charge as estimated by ash analysis, and the silica distribution was non-uniform due to settling and entrapment on the surface of the rubber masterbatch particles.

EXAMPLE 5

Preparation of a Natural Rubber-Silica Masterbatch Blend Compatibilized Silica Slurry with NBR Latex

Compatibilized silica slurry as prepared in Step A of Example 4 above was charged at 3.33 pounds to an agitated vessel containing a mixture of 5.17 lb of latex containing 58.0 weight % natural rubber and 93 g of antioxidant emulsion containing 14.7 weight % Agerite Geltrol® (Vanderbilt Chemical). This mixture was agitated for 30 minutes at 140° F.

The above latex blend was slowly added to a larger vessel which initially contained 8 lb of water and sufficient sulfuric acid to give a pH of 4. The coagulation was completed as in previous examples. The wet masterbatch crumb size achieved by this coagulation was similar to that obtained from SBR and NBR coagulations without silica. Visual inspection and chemical analysis of the dried masterbatch showed that essentially all the silica added to the latex mixture was absorbed and uniformly distributed. Silica absorption was 98–99% of charge as estimated by ash analysis.

EXAMPLE 6

Preparation of an NBR/PVC-Silica Masterbatch Blend Compatibilized Silica Slurry with Latices of NBR and PVC

Compatibilized silica slurry as prepared in Step A of Example 4 above was charged at 6.95 pounds to an agitated vessel containing a mixture of 17.6 lb of latex containing a 70/30 NBR/PVC blend and 154 g of antioxidant emulsion containing 14.7 weight Agerite Geltrol® (Vanderbilt Chemical). The NBR/PVC latex blend contained 14.6 lb of Nysyn® 40–5 at 24.0 weight % rubber solids and 3.0 lb of Geon 151® at 50.00 weight % plastic solids. This mixture was agitated for 30 minutes at 140° F.

The above latex blend was slowly added to a larger vessel which initially contained 15 lb of water and sufficient sulfuric acid to give a pH of 4. The coagulation was completed as in previous examples. The wet masterbatch crumb size achieved by this coagulation was typical of NBR/PVC coagulations without silica. Visual inspection and chemical analysis of the dried masterbatch showed that essentially all the silica added to the latex mixture was absorbed and uniformly distributed. Silica absorption was 98–99% of charge as estimated by ash analysis.

It will be understood that various changes and modifications can be made in the details of procedure, formulation and use without departing from the spirit of the invention, especially as defined in the following claims.

What is claimed:

1. A process for the incorporation of silica into a polymer in latex form comprising the steps of:
   (a) treating a silica with a coupling agent in aqueous suspension to form a compatibilized silica slurry, said coupling agent being an organo silicon compound having the capability of chemically reacting with the surface of the silica to bond the coupling agent thereto; and
   (b) contacting the polymer latex with the compatibilized silica slurry whereby the silica is substantially uniformly distributed throughout the latex.

2. A process as defined in claim 1 wherein the polymer is a polymer selected from the group consisting of a polymer of a conjugated diene, a vinyl monomer and combinations thereof.

3. A process as defined in claim 1 wherein the polymer is a polymer based on a conjugated diene.

4. A process as defined in claim 1 wherein the polymer is a rubber polymer formed by the copolymerization of a conjugated diene with at least one vinyl monomer.

5. A process as defined in claim 4 wherein the vinyl monomer is selected from the group consisting of styrene, alkyl-substituted styrenes, acrylonitrile, methacrylonitrile, isobutylene, acrylic acids and esters, methacrylic acids and esters and vinyl pyridine.

6. A process as defined in claim 1 wherein the polymer is selected from the group consisting of natural rubber, acrylonitrile butadiene rubber, and rubbers formed by the copolymerization of butadiene and vinyl pyridine.

7. A process as defined in claim 1 which includes the step of supplying black slurry to the latex.

8. A process as defined in claim 1 wherein the silica has an average particle size ranging from 1 to 120 nm.

9. A process as defined in claim 1 wherein the silica has a surface area within the range of 15 to 700 m²/g.

10. A process as defined in claim 1 wherein the organo silicon compound has from one to three readily hydrolizable groups attached directly to the silicon atom and at least one organic group attached directly to the silicon atom.

11. A process is defined in claim 10 wherein the organic group attached directly to the silicon atom contains at least one functional group.

12. A process as defined in claim 11 wherein the functional group is selected from the group consisting of an amine group, a polyamino alkyl group, a mercapto group, a polysulfide, a carbonyl group, a hydroxy group, an epoxy group and an ethylinically unsaturated group.

13. A process as defined in claim 11 wherein the functional group is a functional group capable of undergoing a chemical reaction with the polymer during curing of the polymer.

14. A process as defined in claim 1 wherein the coupling agent has the general structure:

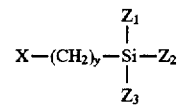

wherein X is a functional group selected from the group consisting of an amino group, a polyamino alkyl group, a mercapto group, a polysulfide, an epoxy group, a vinyl group, an acryloxy group and a methacryloxy group; y is an integer equal to or greater than 0; and $Z_1$, $Z_2$ and $Z_3$ are each independently selected from the group consisting of hydrogen, $C_1$–$C_{18}$ alkyl, aryl, cycloalkyl, aryl alkoxy and halo-substituted alkyl, with the proviso that at least one of $Z_1$, $Z_2$ or $Z_3$ must be alkoxy, hydrogen, halogen or hydroxyl.

15. A process as defined in claim 1 where the coupling agent is a bis(trialkoxysilylalkyl)polysulfide containing 2 to 8 sulfur atoms in which the alkyl groups are $C_1$–$C_{18}$ alkyl groups and the alkoxy groups are $C_1$–$C_8$ alkoxy groups.

16. A process as defined in claim 1 which includes the step of coagulating the polymer latex after it has been contacted with the compatibilized silica slurry to recover the polymer therefrom.

17. A process as defined in claim 1 wherein the silica is treated with a coupling agent dissolved in an aqueous alkanol solution.

18. A process as defined in claim 17 wherein the pH of the aqueous alkanol solution is below 9.

19. A process as defined in claim 1 wherein the silica slurry contains from about 1% to about 30% by weight silica.

20. A process as defined in claim 1 wherein the amount of coupling agent ranges from about 1 to about 25 parts by weight of coupling agent per 100 parts by weight of silica.

21. A process as defined in claim 1 wherein the amount of the compatibilized silica slurry is within the range of about 5% to about 80% based on the weight of the solids in the polymer latex.

22. A process as defined in claim 1 which includes the step of supplying an extender oil and/or a plasticizer to the latex.

23. A process as defined in claim 1 in which the polymer is a blend of acrylonitrile-butadiene rubber and polyvinylchloride.

24. A process for the incorporation of silica into a polymer in latex form comprising the steps of:
   (a) treating a silica with a coupling agent in aqueous suspension to form a compatibilized silica slurry, said coupling agent being an organo silicon compound having the capability of chemically reacting with the surface of the silica to bond the coupling agent thereto;
   (b) contacting the polymer latex with the compatibilized silica slurry whereby the silica is substantially uniformly distributed throughout the latex; and
   (c) coagulating the latex to recover the polymer masterbatch therefrom.

25. A process as defined in claim 24 wherein the polymer is a rubber polymer formed by the copolymerization of a conjugated diene with at least one vinyl monomer.

26. A process as defined in claim 24 which includes the step of supplying a carbon black slurry to the latex.

27. A process as defined in claim 24 wherein the organo silicon compound has from one to three readily hydrolyzable groups attached directly to the silicon atom and at least one organic group attached directly to the silicon atom.

28. A process as defined in claim 24 wherein the functional group is a functional group capable of undergoing a chemical reaction with the polymer during curing of the polymer.

29. A process as defined in claim 24 which includes the step of supplying an extender oil and/or a plasticizer to the latex.

30. A process as defined in claim 24 in which the polymer is a blend of acrylonitrile-butadiene rubber and polyvinyl-chloride.

31. A process for the incorporation of silica into a polymer in latex form comprising the step of contacting the polymer latex with a compatibilized silica slurry whereby the silica is substantially uniformly distributed throughout the latex, the compatibilized silica slurry having been formed by treating the silica with a coupling agent in aqueous suspension.

32. A process for the incorporation of silica into a polymer in latex form comprising the steps of contacting the polymer latex with a compatibilized silica slurry whereby the silica is substantially uniformly distributed throughout the latex, the compatibilized silica slurry having been formed by treating the silica with a coupling agent in aqueous suspension, and coagulating the latex to recover the polymer containing the compatibilized silica substantially uniformly distributed therein.

33. A process as defined in claim 32 wherein at least 90% of the compatibilized silica added to the latex is substantially uniformly distributed through the polymer thus recovered.

34. A process as defined in claim 32 wherein the polymer is a rubber polymer formed by the copolymerization of a conjugated diene with at least one vinyl monomer.

35. A process as defined in claim 32 which includes the step of supplying a carbon black slurry to the latex.

36. A process as defined in claim 32 wherein the organo silicon compound has from one to three readily hydrolyzable groups attached directly to the silicon atom and at least one organic group attached directly to the silicon atom.

37. A process for the incorporation of silica into polymer in latex form comprising the step of contacting a polymer latex with a compatibilized silica, wherein the compatibilized silica has been prepared by treating a silica with a coupling agent in aqueous suspension, the coupling agent being an organosilicon compound having the capability of chemically reacting with the surface of the silica to bond the coupling agent thereto, whereby the compatibilized silica is substantially distributed, both uniformly and quantitatively, throughout the latex.

* * * * *